Figure 1:
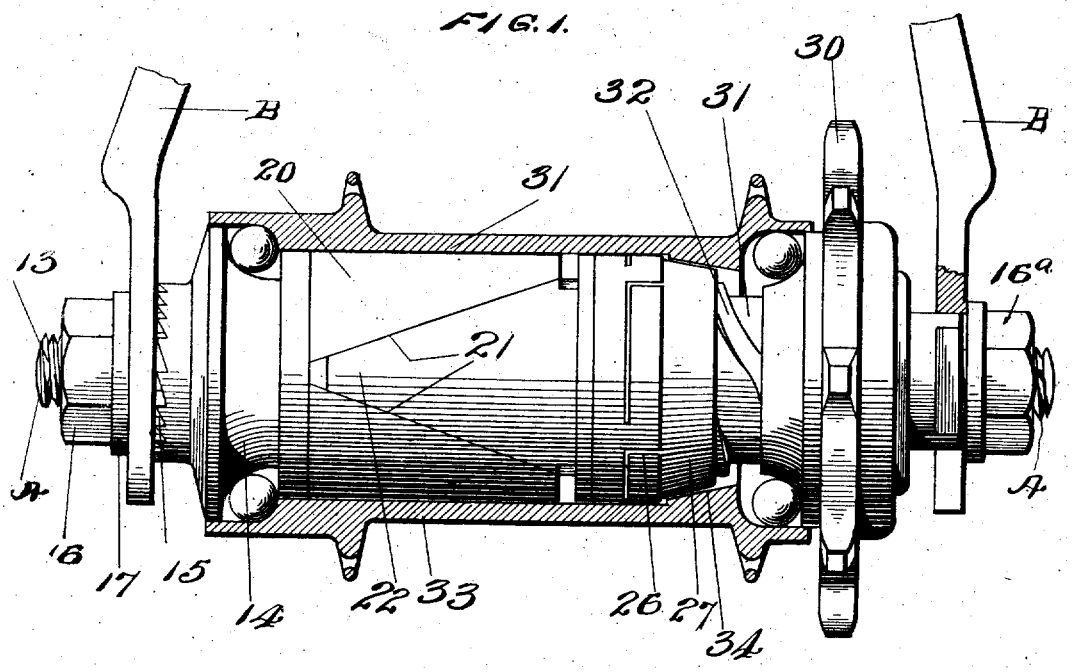

P. P. O'HORO.

COASTER BRAKE.

APPLICATION FILED MAY 18, 1908.

Reissued Sept. 28, 1909.

13,023.

2 SHEETS—SHEET 1.

Witnesses.

Chas. K. Davies

E. L. Corbett

INVENTOR

Peter P. O'Horo by Brock, Becker & Smith

ATTORNEYS

P. P. O'HORO.

COASTER BRAKE.

APPLICATION FILED MAY 18, 1908.

Reissued Sept. 28, 1909.

13,023.

2 SHEETS—SHEET 2.

Witnesses.

Chas K. Davies.

E. L. Corbett

INVENTOR

Peter P. O'Horo by Brock, Beeken & Smith

ATTORNEYS.

UNITED STATES PATENT OFFICE.

PETER P. O'HORO, OF CHICAGO, ILLINOIS, ASSIGNOR TO A. J. MUSSELMAN, OF CHICAGO, ILLINOIS.

COASTER-BRAKE.

13,023. Specification of Reissued Letters Patent. Reissued Sept. 28, 1909.

Original No. 860,234, dated July 16, 1907, Serial No. 325,279. Application for reissue filed May 18, 1908. Serial No. 433,620.

*To all whom it may concern:*

Be it known that I, PETER P. O'HORO, a citizen of the United States, residing at Chicago, in the county of Cook and State of Illinois, have invented a new and useful Improvement in Coaster-Brakes, of which the following is a specification.

My invention provides a new form of coaster-brake in which the brake is applied entirely by lateral movement of the shifter. This method of operation produces a more direct and powerful braking action than previously designed constructions.

The invention also provides a new form and arrangement of retarder for the shifter.

The invention further provides a brake operating member distinct from the shifter and the brake serving to apply the brake by lateral movement.

The invention also provides a new form of brake consisting of a divided sleeve designed to be expanded within the hub by the brake operating device.

The invention further provides improved brake holding means for preventing rotation of the brake and a new and improved manner of connecting said brake holding means with the rear fork of a velocipede for preventing rotation of the brake.

The invention also provides a new and improved form of clutch for holding the shifter stationary and directing its lateral movement during the braking action and a new and improved arrangement of the clutch and brake in relation to other parts of the brake-holding means.

The foregoing and other novel features of the invention and their objects and advantages are hereinafter fully explained so far as is necessary for the instruction of persons versed in the art.

The drawing illustrates a mechanical construction chosen to exemplify the invention, but the invention is capable of embodiment in other forms.

Figure 2:
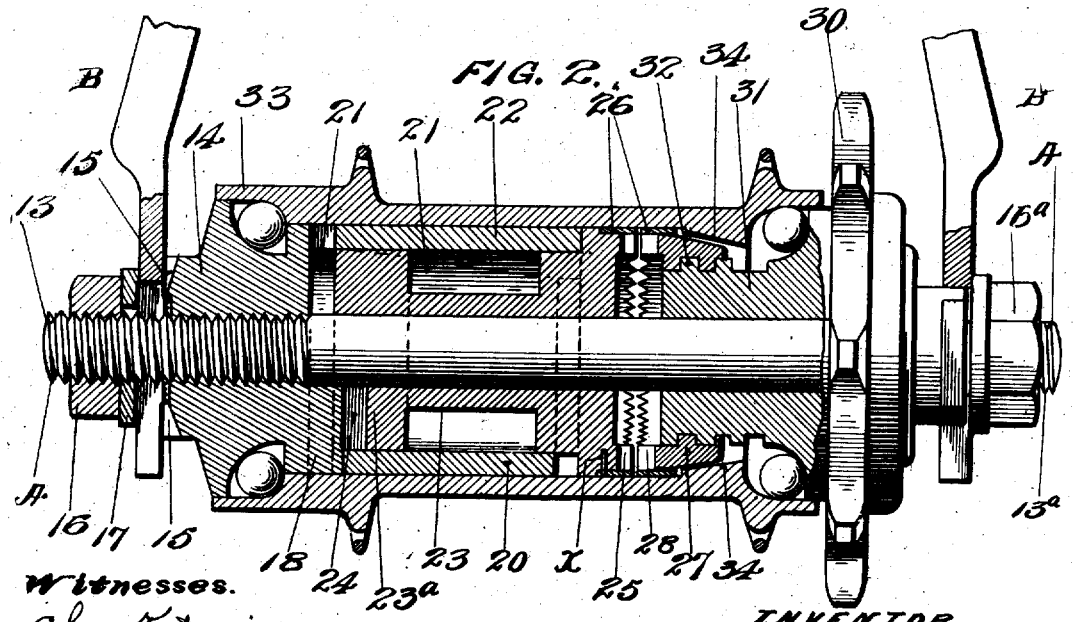
Figure 3:
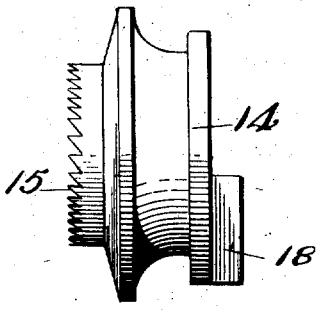
Figure 4:
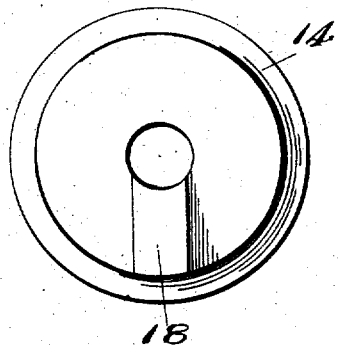
Figure 5:
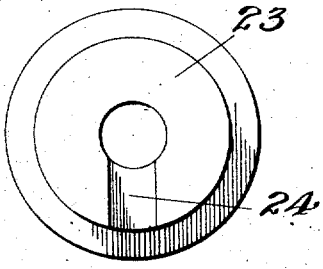
Figure 6:
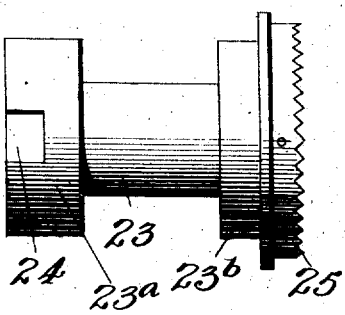
Figure 7:
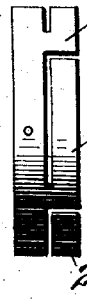
Figure 8:
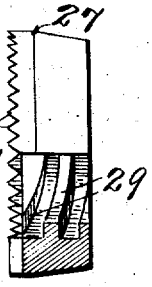
Figure 9:
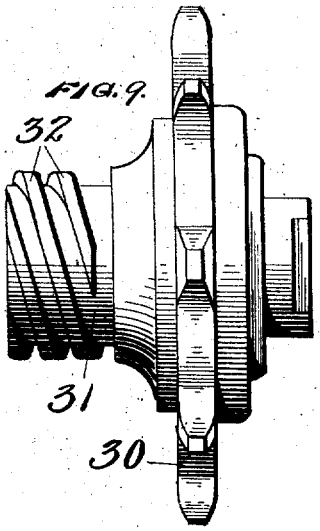
Figure 10:
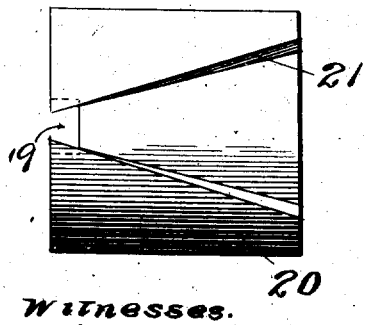
Figure 11:
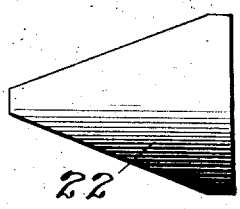
Figure 12:
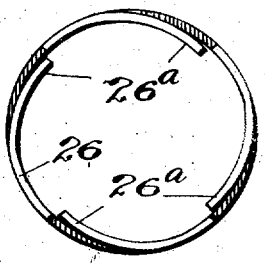

Figure 1 shows the ends of the rear fork of a bicycle with a coaster-brake embodying my invention in position, one-half of the hub being broken away. Fig. 2 is a sectional view taken longitudinally through the coaster-brake, the brake-holding means being turned one-quarter of a rotation in the fork as compared with Fig. 1. Fig. 3 is a side view of the bearing member. Fig. 4 is a right end view of Fig. 3. Fig. 5 is a left end view of the clutch. Fig. 6 is a side view of the clutch. Fig. 7 is a side view of the retarder detached from the clutch. Fig. 8 is a side view of the shifter, one-half being in section. Fig. 9 is a side view of the complete driver. Fig. 10 is a side view of the brake. Fig. 11 is a plan view of the brake operating member or wedge. Fig. 12 is a right end view of the retarder.

Reference character A designates the axle passing through the slots of a rear fork B. The right-hand end of the axle is locked by the customary nut 16[a] and washer clamping the right hand fork end upon the adjusting cone in a well-known manner. The driver 31 is supported at its right hand end by balls, concealed from view in the drawing within its hub, running on the right hand cone. The driver carries the rear sprocket 30. The sleeve of the driver is provided with screw threads 32 engaging internal threads formed in the bore of the shifter 27. The fit of the threads of the driver and shifter is generally somewhat loose. Bearing member 14 is screwed on the left hand end of the axle. The member is provided with a cone. The driver is also provided with a cone and the hub 31 is supported by balls intermediate the two cones mentioned and cups formed in the ends of the hub. The inner face of the bearing member is provided with an extension or lug 18. A spool 23, sometimes identified as a clutch, surrounds the axle and engages lug 18 by means of a slot 24 at one end so that the clutch is restrained from rotation in relation to the bearing member but may move longitudinally in respect to the clutch member and axle. The center portion of spool 23 may be of reduced diameter but the ends are enlarged to provide a seat for the brake 22.

The brake is conveniently in the form of a sleeve split at one side to form a wedge-shaped opening 21. The brake sleeve rests on the enlargements 23[a], 23[b], of the clutch and is provided at one end with a slot 19 engaging lug 18. By thus engaging the lug the brake is restrained from rotation in relation to the bearing member. The brake is also permitted lateral movement by this means although such movement generally is unnecessary. The clutch is also provided with a shoulder ~~23[c] to~~ the right of flange 23[b]. The brake-operator, or "operating member" as it is sometimes identified, exemplified by the wedge 22, lies in the wedge-shaped opening 21 of the brake with its base against the shoulder 23[c] of the clutch and is supported by the flanges 23[a], 23[b] of the clutch.

The retarder 26 exemplified by a ring of thin metal is secured on the right hand end of the clutch by suitable means such as a pin *x*. The portion of the retarder extending beyond the clutch is cut to form spring fingers 26[a] which surround the left end of the shifter 27. These fingers may be bent inward more or less to engage the shifter with a greater or less degree of friction.

The right hand end of the outer surface of the shifter is formed into a conical clutch surface adapted to engage the internal conical clutch surface 34 provided in the hub near its right hand end. Positive clutch members on the shifter and hub may be substituted for the frictional clutch members shown. The left hand end of the shifter is provided with a clutch surface, in the present exemplification consisting of corrugations or serrations 28, and the adjacent end of the clutch 23 has a clutch surface consisting of similar corrugations or serrations 25, this surface sometimes being identified, particularly in the claims, as a "clutch member." The nature of the clutching engagement between the shifter and clutch 23 may be varied. For instance, frictional engagement may take the place of the positive engagement provided at the corrugations 25, 28.

The brake holding device exemplified by bearing member 14 is restrained from rotation by devices comprised entirely within a radius about the axle equal to or less than the radius of the hub and the brace arm heretofore employed in coaster-brakes is dispensed with. Means for restraining the brake holding device from rotation comprise serrations 15 formed on the outer face of bearing member 14 and engaging one face of one of the rear forks B. The fork end is clamped firmly upon the teeth or serrations 15 by nut 16 engaging the screw thread on the left end of the axle, a washer 17 generally being placed between the nut and the fork end. The construction and arrangement of the means for preventing rotation of the brake-holding means may be considerably varied. The form shown is a convenient and satisfactory one.

The mechanism above described operates as follows: Sprocket 30 is connected with the forward sprocket by a chain in the usual manner. When the pedals are revolved forwardly to drive the bicycle the upper teeth of sprocket 30 move away from the eye as seen in Fig. 2, causing forward rotation of the driver. The shifter 27 tends to remain stationary because of its engagement with retarder 26. The movement of the driver and its screw threads 32 in relation to the shifter therefore causes the shifter to move laterally to the right with little or no rotation until its clutch surface engages the complemental clutch member 34 of the hub, whereupon the hub is clamped firmly between the shifter and the cone of the driver and rotates with the driver, propelling the bicycle. It is sometimes unnecessary to provide active spring contact of the fingers 26[a] of the retarder with the shifter. There may be a slight clearance between these fingers and the shifter. In this case the loose fit between the threads of the driver and the shifter permits the shifter when free to drop slightly so that its lower surface engages the retarder and this slight contact is sufficient to insure the proper movements of the shifter. Upon engagement of the shifter with the hub the shifter tends to center itself and when centered the shifter becomes entirely free from the retarder and even the slight frictional effect of the retarder is avoided. In other cases the fingers of the retarder may be in actual contact with the shifter at all times. To coast the rider holds the pedals stationary whereupon sprocket 30 stops and the forward rotation of the hub causes the shifter to continue to rotate forwardly a short distance during which rotation the shifter moves to the left because of its engagement with the screw threads of the stationary driver. The shifter then is in the position in which it is shown in Fig. 2 midway betwen the hub clutch and the stationary clutch without engaging either of them. To apply the brake the rider turns the pedals backward causing reverse rotation of sprocket 30 and driver 31. At the commencement of this reverse rotation the shifter tends to remain stationary by its engagement with the retarder and the relative movement of the threads of the driver causes the shifter to move to the left without rotation of any consequence until its clutch member 28 engages the clutch member 25 of the stationary clutch. The shifter is thereupon securely restrained from rotation in a reverse direction which is its tendency under the action of the driver in braking. Continued reverse rotation of the driver causes the shifter to move farther to the left, thus moving to the left also the clutch 23 and brake operator or wedge 22, the base of which engages a shoulder on the clutch. This movement of the clutch separates the adjacent faces of the split brake sleeve 20 and brings the surface of the brake sleeve into contact with the bore of the hub. The rotative tendency of the hub is now transmitted through the brake to lug 18 and through bearing member 14 and the serrations 15 and other portions of the clamping mechanism to the rear fork. In other words, the brake is prevented from rotation and since it engages the hub, rotation of the hub is retarded or stopped according to the wish of the rider. As the shifter moves to the left carrying with it the clutch, the clutch slides within the brake and the slot 23 of the clutch moves upon lug 18 of the bearing member 14, which acts as a key to permit this longitudinal movement of the clutch and at the same time prevent rotation thereof. The purpose of preventing the clutch from rotating is to insure that the shifter remains irrevoluble during the braking action. To discontinue the braking action reverse effort upon the pedals is discontinued. The brake sleeve which has been expanded now contracts to its normal shape, thereby forcing wedge 22 to the right. The wedge carries with it the clutch 23 and the clutch moves the shifter to the right. The brake is now disengaged from the hub and the bicycle coasts freely. To drive, the pedals are rotated forwardly, imparting similar movement to the driver and the shifter is first withdrawn from the stationary clutch and then engages the hub and drives the latter in a manner which is clear from the foregoing description.

I claim:

1. In combination, a coaster-brake having a stationary threaded axle and a sprocket, a wheel-hub rotatably surrounding the axle, an expansible braking-sleeve about said axle within the hub, a wedge for expanding said sleeve, a spool on the axle within said sleeve engaging the wedge, means for driving the spool against the wedge, a collar screwed on the axle and interlocking with said sleeve, a serrated gripping bearing upon said collar, bearings for the axle-ends, and a nut on an end of the axle, between which and said serrated gripping bearing the adjacent bearing is clamped.

2. In coaster-brake mechanism, the combination with the rear fork of a bicycle of a revoluble hub, a stationary axle secured in the fork, a brake, a serrated gripping member engaging the side of the fork and rigidly connected to the brake in respect to rotary movement, and means for forcing the gripping member against the fork and thereby preventing rotation of the brake.

3. In a coaster brake, the combination of an axle, a hub, a driver, a shifter having a screw connection with the driver, a bearing member on the axle near one end thereof, the bearing member being provided with an inward projection, a clutch engaging said projection and permitted lateral movement, a brake engaging said projection, and brake-expanding means intermediate the clutch and brake, the shifter being provided with clutch members to engage the hub and the clutch aforesaid.

4. In a coaster-brake, the combination of an axle, a hub, a driver, a shifter, and a bearing member on the axle near one end thereof, the bearing member having a lug extending from its inner face, a clutch member slotted at one end to engage the lug and adapted at the other end for engagement by the shifter to prevent rotation thereof, a brake sleeve split at one side and engaging the lug, a wedge moving in accordance with lateral movement of the clutch member and serving to expand the brake sleeve, and a retarder intermediate the clutch member and the shifter serving to retard rotation of the shifter.

5. In a coaster-brake, the combination of an axle adapted to pass through the usual slots in the rear forks of a bicycle, a hub, a driver, a shifter, a brake within the hub and brake holding means comprising a member within the hub engaging the brake, a serrated member outside the hub and means for clamping the serrated member against one of the fork sides whereby the brake is restrained from rotation.

6. In a coaster brake, the combination of an axle, a bearing member thereon provided with a lug, a spool on the axle having a slot engaging the lug, a brake sleeve supported by the spool and provided with a slot engaging the lug, a hub, a driver, a shifter, and means actuated by lateral movement of the shifter for expanding the brake sleeve.

7. The combination of an axle, a hub, a bearing member provided with a lug, a spool provided with a slot engaging the lug so that the spool may move laterally on the axle but may not revolve, a brake sleeve supported by the spool and having a slot engaging the lug, a wedge moving in accordance with lateral movement of the spool and serving to expand the brake sleeve, the said spool being provided with a clutch member, a shifter having a clutch member adapted to engage the clutch member of the spool, a clutch member upon the shifter adapted to engage the hub, and a driver having a screw connection with the shifter.

PETER P. O'HORO.

Witnesses:
A. J. MUSSELMAN,
CHARLES L. HINE.